(12) United States Patent
Miller et al.

(10) Patent No.: US 8,596,712 B2
(45) Date of Patent: Dec. 3, 2013

(54) VEHICLE CABIN INTRUSION MANAGEMENT

(75) Inventors: Ryan A. Miller, Columbus, OH (US);
Eric M. Heitkamp, Dublin, OH (US);
Jason T. Hardesty, Dublin, OH (US);
Tyler Jackson, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 13/175,463

(22) Filed: Jul. 1, 2011

(65) Prior Publication Data

US 2013/0001985 A1   Jan. 3, 2013

(51) Int. Cl.
*B62D 25/00* (2006.01)
*B62D 25/14* (2006.01)

(52) U.S. Cl.
USPC .................................. 296/193.02; 296/187.03

(58) Field of Classification Search
USPC ............... 296/70, 72, 24.34, 193.02, 193.07;
280/752, 795, 779, 751; 180/90
See application file for complete search history.

(56) References Cited

U.S. PATENT DOCUMENTS

| | | | |
|---|---|---|---|
| 1,198,064 A | 9/1916 | Schaffert | |
| 3,779,591 A | 12/1973 | Rands | |
| 3,893,726 A | 7/1975 | Strohschein | |
| 5,431,442 A * | 7/1995 | Tomita et al. | 280/752 |
| 5,564,769 A * | 10/1996 | Deneau et al. | 296/72 |
| 5,758,920 A | 6/1998 | Stephan | |
| 6,231,116 B1 | 5/2001 | Naert et al. | |
| 6,250,678 B1 * | 6/2001 | Yoshinaka et al. | 280/752 |
| 6,296,303 B1 | 10/2001 | Kamiya et al. | |
| 6,394,527 B2 * | 5/2002 | Ohno et al. | 296/72 |
| 6,450,533 B1 | 9/2002 | Kimura et al. | |
| 6,517,139 B2 | 2/2003 | Sutou et al. | |
| 6,523,878 B2 | 2/2003 | Scheidel | |
| 6,655,721 B2 | 12/2003 | Hagen | |
| 6,945,373 B2 | 9/2005 | Huber | |
| 7,311,327 B2 * | 12/2007 | Yamazaki | 280/752 |
| 7,370,719 B2 | 5/2008 | Sakamoto | |
| 7,374,232 B2 | 5/2008 | Ellison et al. | |
| 7,484,781 B1 | 2/2009 | Garber et al. | |
| 7,735,866 B2 * | 6/2010 | Clashman et al. | 280/752 |
| 7,810,874 B2 | 10/2010 | Vican et al. | |
| 2001/0035641 A1 | 11/2001 | Ohno et al. | |

(Continued)

FOREIGN PATENT DOCUMENTS

| | | |
|---|---|---|
| JP | 2005014786 | 1/2005 |
| JP | 2008247062 | 10/2008 |

OTHER PUBLICATIONS

International Search Report and Written Opinion of PCT/US12/42968 dated Sep. 12, 2012.

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A hanger beam assembly for a vehicle comprises a support beam extending in a vehicle widthwise direction. The support beam includes a first beam member. The first beam member is positioned between a blower assembly of a vehicle HVAC system and a dashboard on a front passenger side of the vehicle. The first beam member is configured to at least partially sever the blower assembly and direct a lower portion of the blower assembly having a blower motor away from the dashboard during a crash incident to at least partially prevent intrusion of the lower portion of the blower assembly into the dashboard.

20 Claims, 7 Drawing Sheets

(56) References Cited

U.S. PATENT DOCUMENTS

| | | | |
|---|---|---|---|
| 2002/0050726 A1* | 5/2002 | Okana et al. | 296/70 |
| 2006/0017310 A1* | 1/2006 | Joo et al. | 296/193.02 |
| 2008/0238128 A1 | 10/2008 | Baudart et al. | |
| 2009/0085338 A1 | 4/2009 | Tanaka et al. | |
| 2009/0090211 A1 | 4/2009 | Kuwano | |

* cited by examiner

VEHICLE CABIN INTRUSION MANAGEMENT

BACKGROUND

Exemplary embodiments herein generally relate to vehicle cabin intrusion management, and, more particularly, relate to a hanger beam assembly for preventing cabin intrusion of a vehicle part during a crash incident.

As is well known, hanger beam assemblies are structural components that extend between the vehicle A-pillars and serve as a mount for the vehicle dashboard, instrument panels, and a steering column assembly. Conventional hanger beam assemblies are formed from a variety of steel components, typically steel tubes and stampings, which are mechanically affixed to one another to form a relatively unitary structure.

The National Highway Traffic Safety Administration (NHTSA) has a New Car Assessment Program which includes an AF5% occupant on the passenger side of a vehicle. The NHTSA point systems includes femur load as part of their criteria. In order to achieve a good score, the femur loads must be reduced by about 75% to 80% during a crash incident. FIGS. 1 and 2 schematically illustrate a problem associated with a known vehicle assembly 100 during a crash incident. The vehicle assembly 100 includes an engine compartment 110 for housing a vehicle part, such as an engine 112, and a passenger compartment 114, particularly a front passenger side of the passenger compartment. The passenger compartment 114 is separated from the engine compartment 110 by a firewall 116. A HVAC system 120 is positioned in the passenger compartment 114 between the firewall 116 and a dashboard 122. The HVAC system includes a blower assembly 124 having an upper portion 126 and a lower portion 128 which houses a blower motor (not shown). The dashboard 122 is at least partially supported by a hanger beam assembly 130 and includes a storage compartment or glovebox 132. A knee bolster (not shown) is provided in the glovebox area of the dashboard 122.

During a crash incident, the engine 112 can be pushed back and can intrude into the firewall 116 and passenger compartment 114. This can drive the upper portion 126 of the HVAC blower assembly 124 into the hanger beam assembly 130 and the lower portion 128 into the glove box area of a dashboard 122. The upper portion 126 is deformed or crushed by the hanger beam assembly 130. However, with the depicted vehicle assembly 100, the lower portion 128 can push the dashboard 122 including the knee bolster into the legs 140 of the occupant 142 causing an increase in femur load.

BRIEF DESCRIPTION

In accordance with one aspect, a hanger beam assembly for a vehicle comprises a support beam extending in a vehicle widthwise direction. The support beam includes a first beam member. The first beam member is positioned between a blower assembly of a vehicle HVAC system and a dashboard on a front passenger side of the vehicle. The first beam member is configured to at least partially sever the blower assembly and direct a lower portion of the blower assembly away from the dashboard during a crash incident to at least partially prevent intrusion of the lower portion of the blower assembly into the dashboard.

In accordance with another aspect, a vehicle assembly comprises a blower assembly including a lower housing portion and an upper housing portion. The lower housing portion is adapted to house a blower motor. The blower assembly is located in front of a front passenger side of the vehicle. A hanger beam assembly extends in a widthwise direction of the vehicle. The hanger beam assembly includes a first beam member including a projection configured to at least partially separate the lower housing portion from the upper housing portion. The first beam member is configured to direct the separated lower portion of the blower assembly downwardly during a crash incident to at least partially prevent intrusion of the lower portion of the blower assembly into the front passenger side of the vehicle.

In accordance with yet another aspect, a method of controlling intrusion of a vehicle part into a passenger cabin during a crash incident is provided. The method comprises positioning a support beam between the vehicle part and the passenger cabin. A first portion of the support beam facing the vehicle part has a projection and a ramp section. The vehicle part is severed with the projection of the support beam. The vehicle part is separated into a lower portion and an upper portion. The lower portion of the vehicle part is urged downwardly with the ramp section of the support beam.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary hanger beam assembly disclosed herein are merely terms of art that may vary from one manufacturer to another and should not be deemed to limit the present disclosure.

Figure 1:
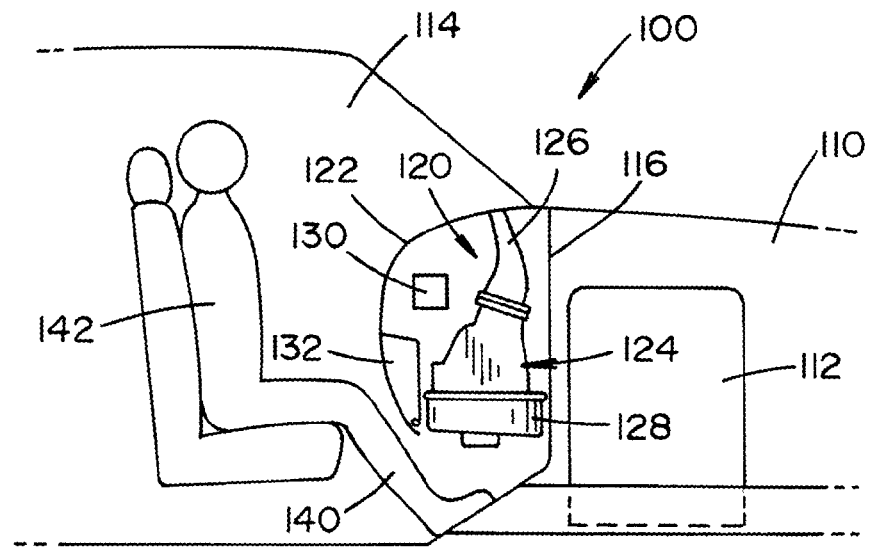
FIG. 1 schematically illustrates a known vehicle assembly including an engine compartment, an engine provided in the engine compartment, a passenger compartment, and a HVAC system provided in the passenger compartment.
Figure 2:
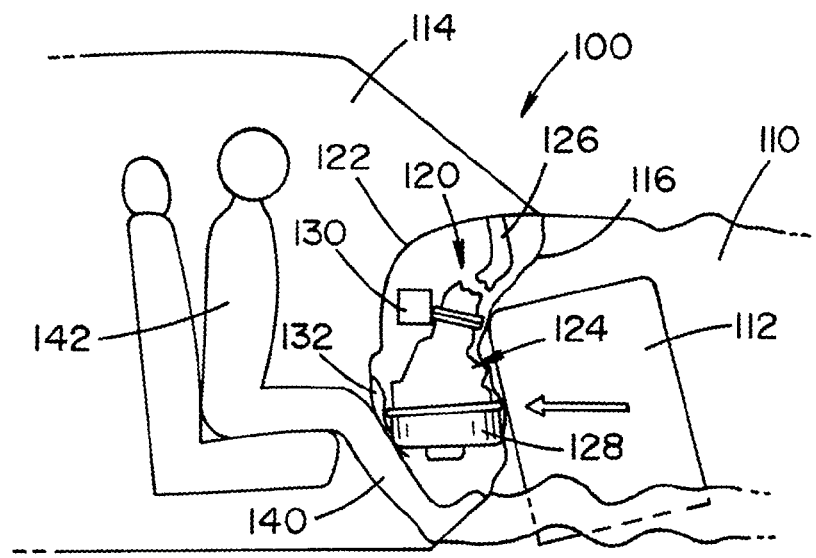
FIG. 2 schematically illustrates the known vehicle assembly of FIG. 1 during a crash incident.
Figure 3:
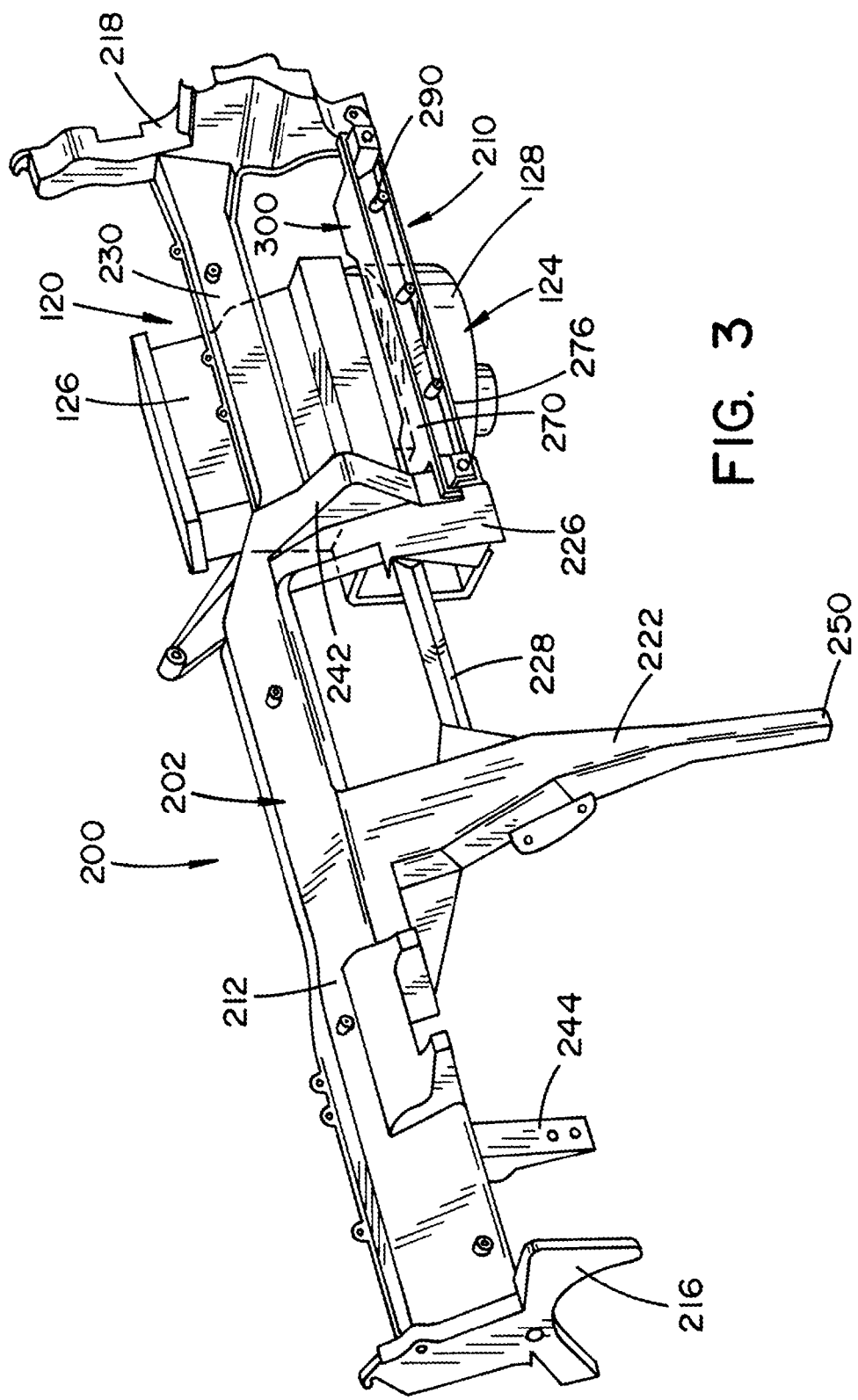
FIG. 3 is a perspective view of an exemplary hanger beam assembly and the HVAC system for the vehicle assembly of FIG. 1. The hanger beam assembly is positioned in front of the HVAC system of FIG. 1 and includes a support beam and a first beam member according to one aspect of the present disclosure.

Referring now to the drawings, wherein like numerals refer to like parts throughout the several views, FIG. 3 schematically illustrates an exemplary hanger beam assembly 200 which can be included in the vehicle assembly 100 of FIG. 1 according to the present disclosure. The hanger beam assembly 200 comprises a support beam 202 which extends in a vehicle widthwise direction. The support beam 202 includes a first beam member 210 according to one exemplary aspect of the disclosure. When assembled in the vehicle assembly 100, the first beam member 210 is positioned between the blower assembly 124 of the vehicle HVAC system 120 and the dashboard 122 (FIG. 5) on a front passenger side of the vehicle. As will be discussed in detail below, the first beam member 210 is configured to at least partially sever the blower assembly 124 and direct the lower portion 128 of the blower assembly 124 having a blower motor away from the dashboard 122 during a crash incident to at least partially prevent intrusion of the lower portion 128 of the blower assembly into the dashboard 122.

With reference to FIG. 3, the support beam 202 of the hanger beam assembly 200 generally includes a main beam 212, a first or driver's side support bracket 216, a second or passenger's side support bracket 218, a main beam support 222, a center support 226, a stay 228, the first beam member 210, and a second beam member 230. The second beam member 230 is positioned above and substantially parallel to the first beam member 210. As will be appreciated by those skilled in the art, the hanger beam assembly 200 is a structural assembly to which the vehicle dashboard 122 is mounted and on which associated components of the vehicle, such as the steering column assembly, instrument panel, navigation and climate control panels, and glove box, are mounted. As such, the hanger beam assembly 200 extends generally across the entire width of the vehicle, between the driver's side and passenger's side A-pillars (not shown) provided by the vehicle frame.

Figure 4:
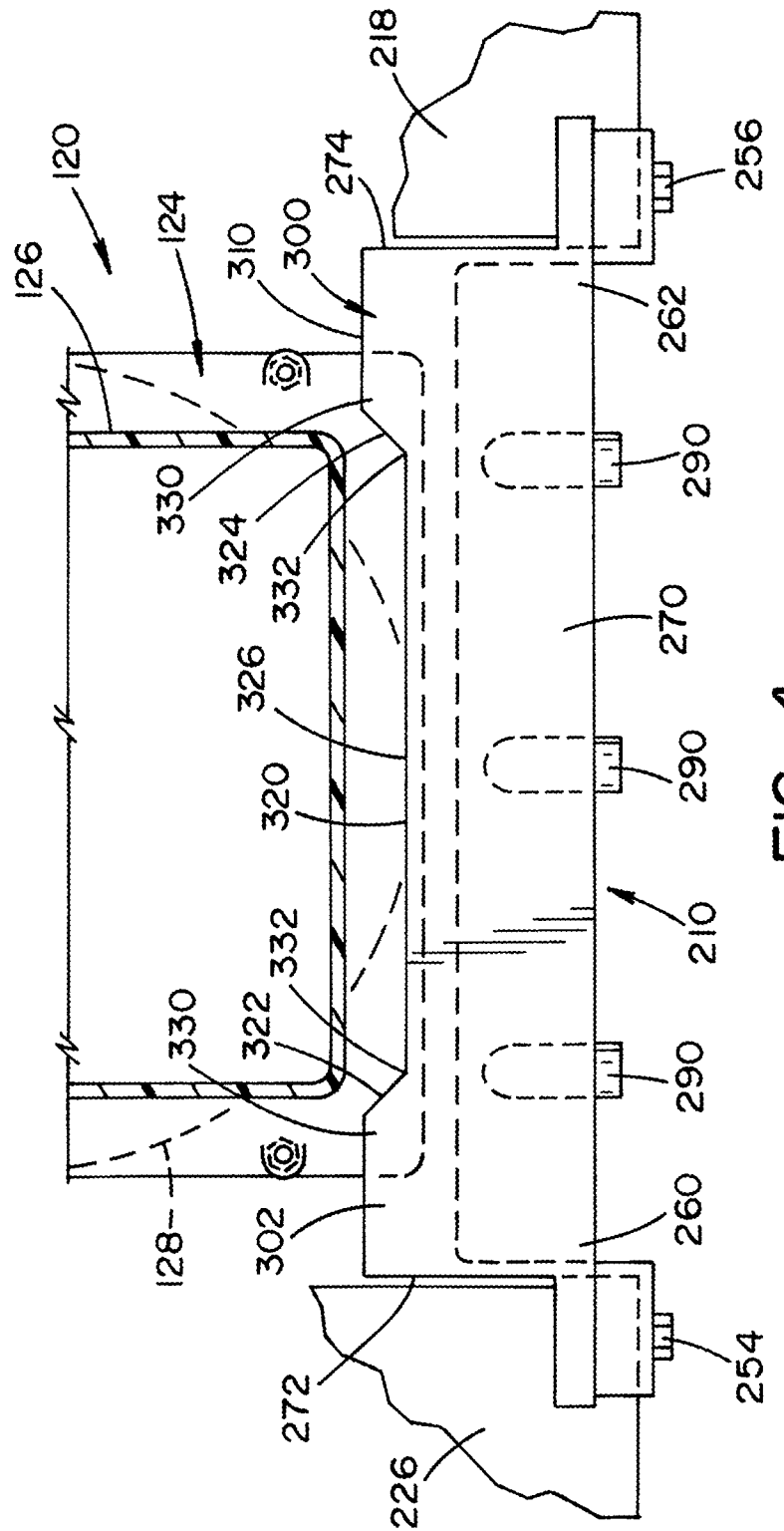
FIG. 4 is a partial top cross-sectional view of the hanger beam assembly and HVAC system of FIG. 3.

Generally, the first support bracket 216 is secured to the vehicle driver's side A-pillar (not shown). The main beam 212 extends between the first support bracket 216 and a main beam hanger 242 provided on the center support 226, and has a dashboard knee bolster 244 and steering column support brackets (not shown) affixed thereto at predetermined locations. The main beam support 222 extends downwardly from the main beam 212, and a lower end 250 of the main beam support 222 can be affixed to a floor frame (not shown) of the vehicle. The first beam member 210 and the second beam member 230 extend laterally from the center support 226 to the second support bracket 218, which, in turn, is secured to the vehicle passenger's side A-pillar (not shown). The stay 228 extends laterally between the main beam support 222 and the center support 226. The first beam member 210 can be integrally formed with the support beam 202 or, as depicted in FIG. 4, can be mechanically affixed to the support beam 202 via attachment members 254,256 provided on opposed ends 260,262 of the first beam member 210. Similarly, the second beam member 230 can be one of integrally formed with the support beam 202 or mechanically affixed to the support beam. The hanger beam assembly 200 can be cast from a variety of materials, such as aluminum and magnesium.

Figure 5:
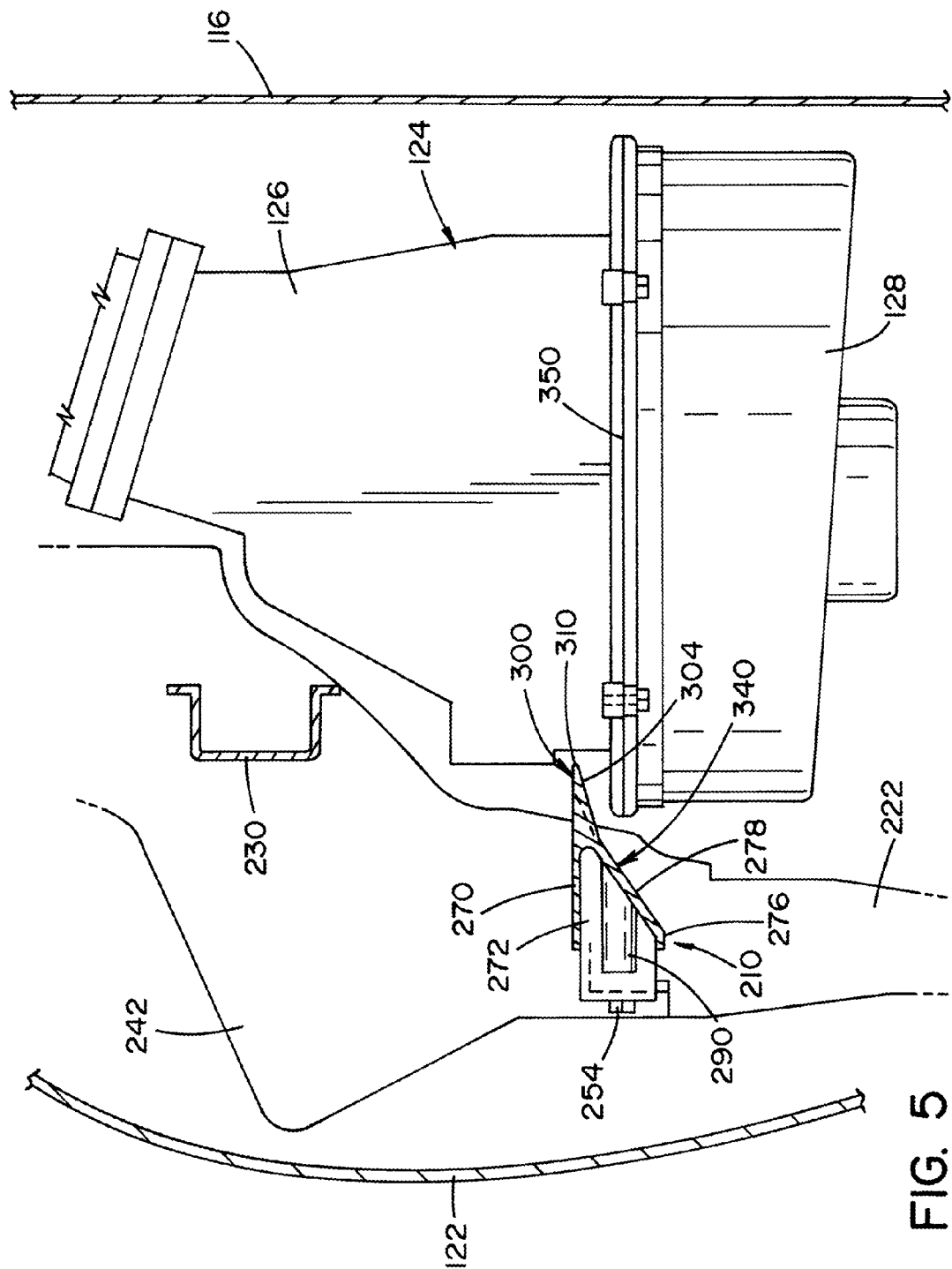
FIG. 5 is partial side cross-sectional view of the hanger beam assembly and HVAC system of FIG. 3 positioned in the vehicle assembly of FIG. 1

With reference to FIGS. 4 and 5, the first beam member 210 includes a top wall 270, side walls 272 and 274, a bottom wall 276 and a front wall 278. The top wall has a widthwise dimension greater than a widthwise dimension of the bottom wall (the widthwise direction being measured in the direction of vehicle travel). The front wall 278 interconnects the top wall 270 and bottom wall 276, and spans between the side walls 272,274. In cross-section taken normal to a vehicle transverse direction, the first beam member 210 is generally triangular in shape. At least one boss 290 is located on the front wall 278 and extends in a rearward direction toward the dashboard 122. As shown, three spaced apart bosses 290 are provided on the front wall 278; although, this is not required. The bosses 290 allow for the mounting of a vehicle part, such as a knee bolster (not shown) or a glovebox 132 (FIG. 1), to the hanger beam assembly 200.

Figure 6:
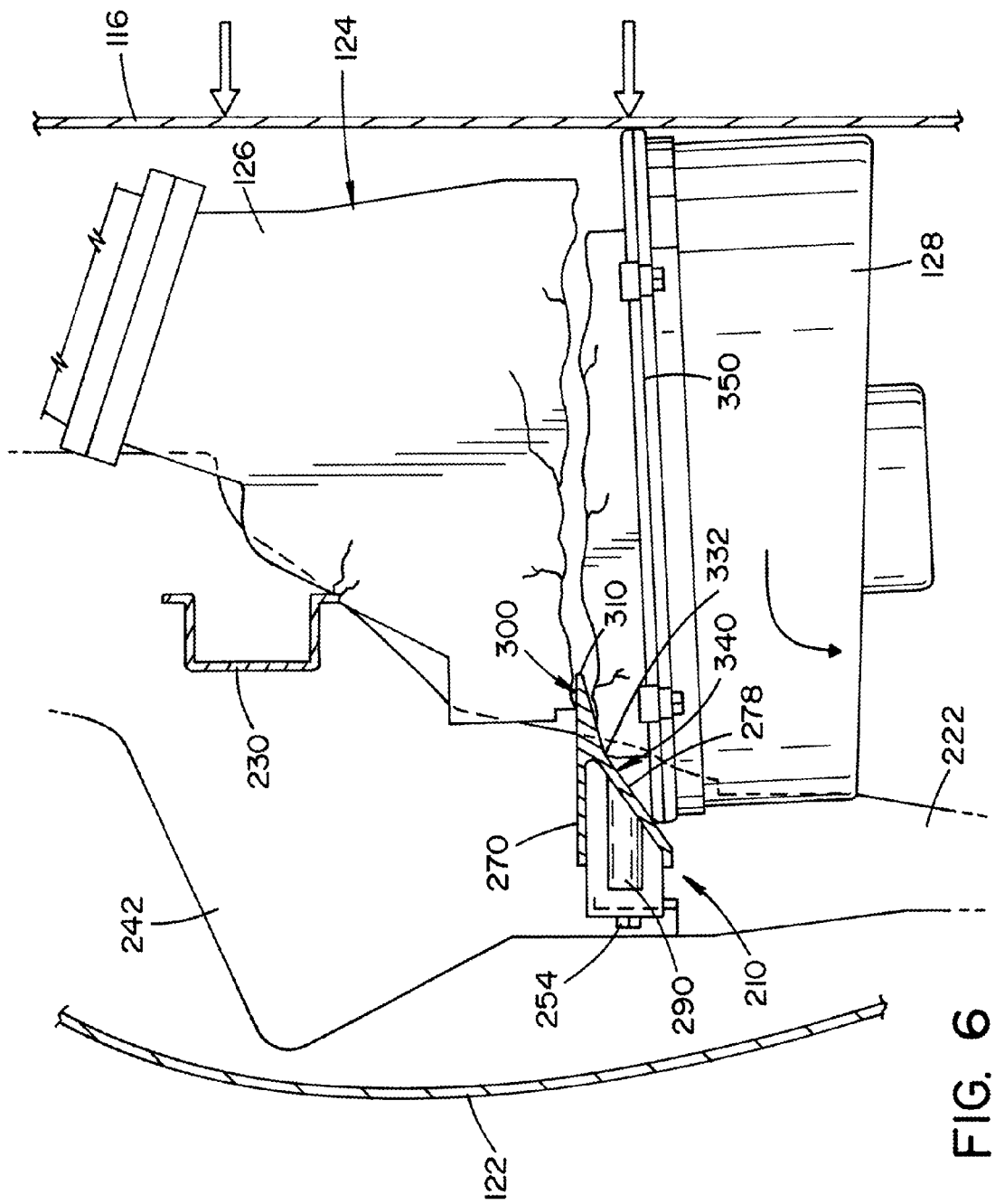
FIG. 6 is a partial side cross-sectional view of FIG. 5 during a crash incident.

A projection 300 extends outwardly toward the blower assembly 124 and is configured to at least partially sever the blower assembly during a crash incident (FIG. 6). In the depicted embodiment, the projection is generally wedge shaped in cross-section taken normal to a vehicle transverse direction and defines an upper edge 310 of the first beam member 210. The projection 300 includes a top surface 302 and a bottom surface 304. The top surface 302 is substantially contiguous with an upper surface of the top wall 270 such that the top wall 270 at least partially includes the projection 300. The bottom surface 304 extends angularly from the front wall 278 such that the bottom surface and the front wall define an obtuse angle.

As best depicted in FIG. 4, the projection 300 further includes an inwardly extending offset region 320. The offset region 320 includes spaced apart angled surfaces 322,324 which converge toward one another and a forward surface 326. The forward surface 326 interconnects the angled surfaces 322,324 and extends substantially parallel to the upper edge 310. This offset region 320 separates the projection into a first contact region 330 (which is provided on the opposed ends 260,262 of the first beam member 210 and defines first and second wedge-shaped edges) for severing the blower assembly 124 and a second contact region 332 (which is centrally located on the first beam member 210) for urging the severed portion of the blower assembly downwardly. By providing the offset region 320 on the projection 300, an axial load on the first beam member 210 is limited by the first contact region 330 and a moment force on a wall of the blower assembly 124 is created by the second contact region 332 during a crash incident.

The first beam member 210 further includes a ramp section 340 which extends at an incline away from the projection 300 and is at least partially defined by the front wall 278. As illustrated in FIG. 6, the ramp section 340 is provided in the second contact region 332. During a crash incident, the engine 112 (FIG. 1) can be pushed back and can intrude into the firewall 116 and the passenger compartment 114. This can drive the upper portion 126 of the blower assembly 124 into the second beam member 230, which is configured to engage and deform the upper portion 126 during the crash incident. As the blower assembly 124 is being pushed toward the dashboard 122, the projection 300 pierces the upper portion 126 above a mating line 350 (which is defined by the connection of the upper portion 126 and the lower portion 128). The first contact region 330 of the projection 300 cracks the upper portion 126 and the lower portion 128 engages the second contact region 332. The ramp section 340 is configured to urge the lower portion 128 of the blower assembly 124 having the blower motor downwardly during a crash incident to at least partially prevent intrusion of the lower portion 128 into the dashboard. This, in turn, limits femur load on the occupant.

Figure 7:
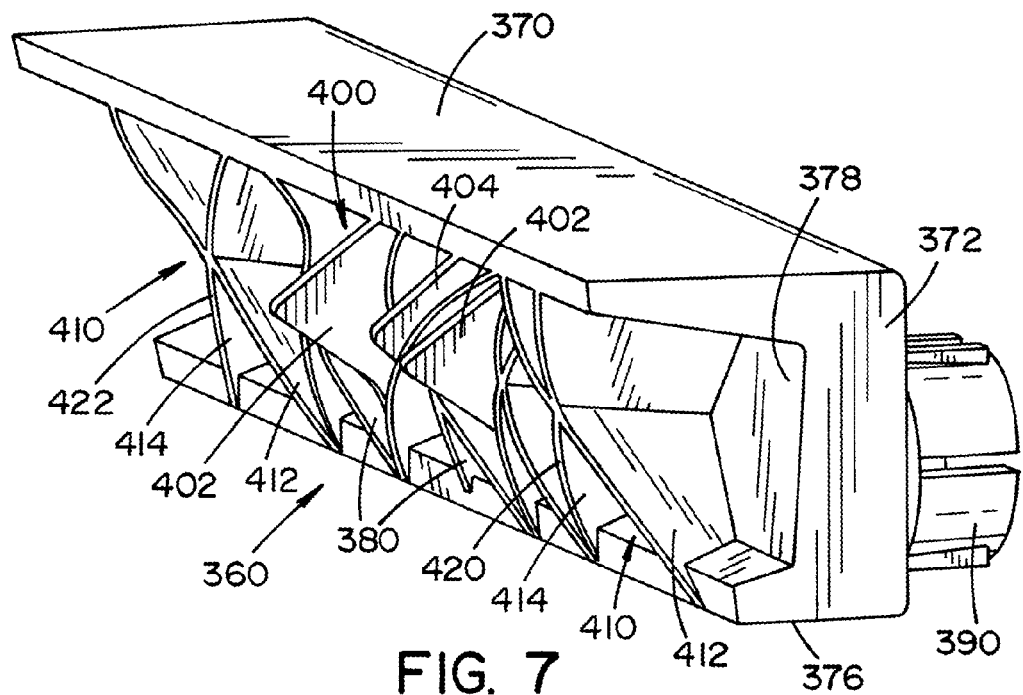
FIG. 7 is a perspective view of a first beam member of the support beam of FIG. 3 according to another aspect of the present disclosure.

With reference now to FIG. 7, a first beam member 360 for the support beam 202 of the hanger beam assembly 200 according to another aspect of the present disclosure is illustrated. The first beam member 360 includes a top wall 370, side walls (only side wall 372 is shown), a bottom wall 376 and a front wall 378. The top wall has a widthwise dimension greater than a widthwise dimension of the bottom wall (the widthwise direction being measured in the direction of vehicle travel). The front wall 378 interconnects the top wall 370 and bottom wall 376, and spans between the side walls. In cross-section taken normal to the vehicle transverse direction, the first beam member 360 is generally U-shaped. Strengthening members or gussets 380 are provided on the first beam member 360. The strengthening members 380 extend between the top wall 370 and bottom wall 376 and can be connected to the front wall 378. At least one boss 390 is located on the front wall 378 and extends in a rearward direction toward the dashboard 122 for the mounting of a vehicle part, such as a knee bolster (not shown) or a glovebox 132 (FIG. 1), to the hanger beam assembly 200.

Figure 9:
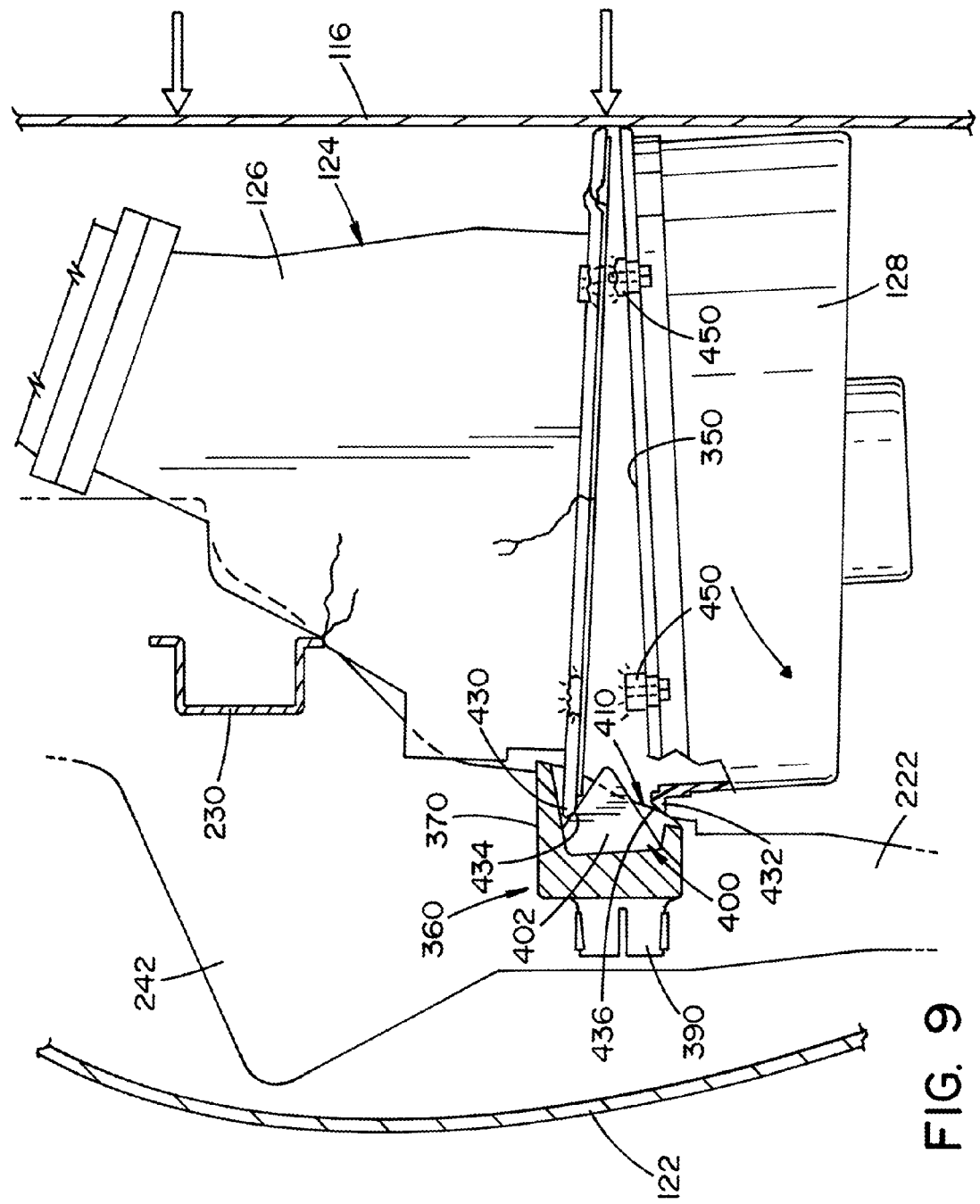
FIG. 9 is a partial side cross-sectional view of the hanger beam assembly and HVAC system of FIG. 8 positioned in the vehicle assembly of FIG. 1 during a crash incident.

At least one projection 400 extends outwardly from the front wall 378 toward the blower assembly 124 and is configured to at least partially sever the blower assembly during a crash incident (FIG. 9). In the depicted embodiment, the at least one projection 400 includes a pair of spaced apart first projections 402 and a second projection 404 located between the first projections 402. The projections 402,404 are positioned centrally on the front wall 378 of the first beam member 360 in the vehicle transverse direction and are located at least partially below the top wall 370. Particularly, the first projections 402 extend a first distance from the front wall 378 and the second projection 404 extends a second distance from the front wall 378, which is less than the first distance. Both the first distance and the second distance are greater than the widthwise dimension of the top wall 370. Each projection 402,404 is generally triangular shaped in cross-section taken normal to the vehicle transverse direction.

The first beam member 360 further includes a ramp section 410 positioned on the front wall 378. In the depicted embodiment, a pair of ramp sections 410 is provided, each ramp section being located between one of the side walls and one of the first projections 402. As shown, the ramp section 410 is formed of a first fin member 412 and a second fin member 414. Each fin member 412,414 extends at an incline between the top wall 370 and the bottom wall 376, and an exposed surface 420,422 of each respective fin member 412,414 is spaced inwardly of the first and second projections 402,404. Further, the first and second fin members 412,414 intersect such that the ramp section is X-shaped when viewed from the front of the first beam member 360.

Figure 8:
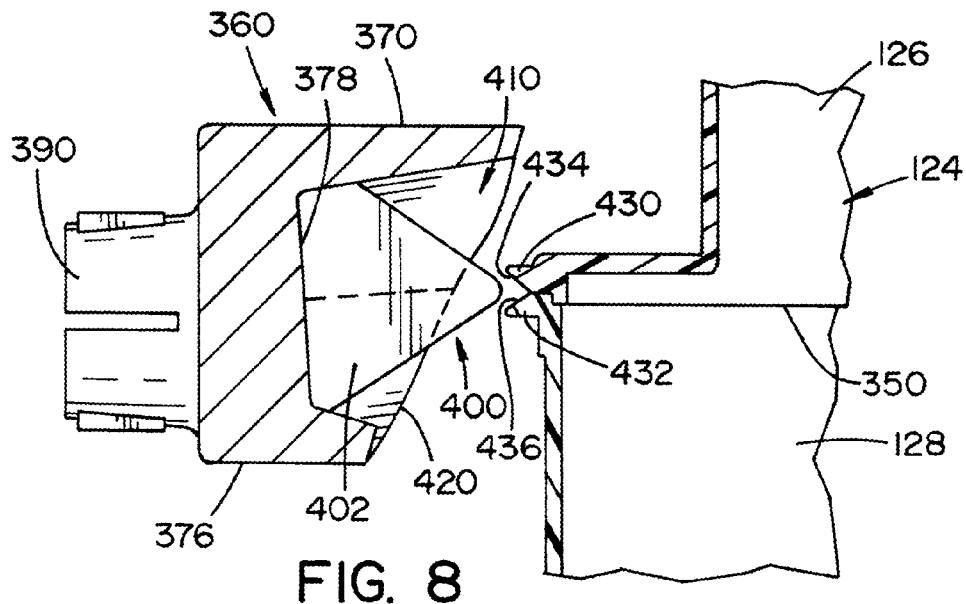
FIG. 8 is a partial side cross-sectional view of the first beam member of FIG. 7 positioned in front of another HVAC system.

Similar to ramp section 340, ramp section 410 is configured to urge the lower portion 128 of the blower assembly 124 having the blower motor downwardly during a crash incident to at least partially prevent intrusion of the lower portion 128 into the dashboard. As shown in FIG. 8, to facilitate separation of the lower portion 128 from the upper portion 126 at the mating line 350, the blower assembly 124 further includes an upper guide 430 and a lower guide 432. The upper guide 430 is secured to the upper portion 126 adjacent the mating line 350 and the lower guide 432 is secured to the lower portion 128 adjacent the mating line. As shown, the upper and lower guides are integrally formed with the blower assembly; although, this is not required. Each of the upper and lower guides 430,432 includes an outer surface 434,436 which extends at an incline toward the mating line 350. The outer surfaces 434,436 together substantially correspond in shape to the shape of the projection 400.

As depicted in FIG. 9, during a crash incident, the engine 112 (FIG. 1) can be pushed back and can intrude into the firewall 116 and passenger compartment 114. This can drive the upper portion 126 of the blower assembly 124 into the second beam member 230, which, again, is configured to engage and deform the upper portion 126 during the crash incident. As the blower assembly 124 is being pushed toward the dashboard 122, the upper and lower guides 430,432 engage the projection 400 and guide the projection 400 along the mating line 350. The projection 400 then separates the upper portion 126 from the lower portion 128 at the mating line. Particularly, as the projection 400 moves along the mating line 350, the upper guide 430 of the upper portion 126 moves along an upper section of the projection 400 and engages the top wall 370. This engagement prevents further intrusion of the upper portion 126. The lower guide 432 of the lower portion 128 engages the ramp section 410 and is urged downwardly. This causes further separation at the mating line 350, this separation breaking screw bosses 450 that connect the upper portion 126 to the lower portion 128 of the blower assembly 124. The downward movement of the lower section 128 at least partially prevents intrusion of the lower portion 128 into the dashboard. This, in turn, limits femur load on the occupant.

As is evident from the foregoing, the present disclosure provides a hanger beam assembly 200 configured to prevent the instrument panel or dashboard 122 from being driven into the occupant's legs. The hanger beam assembly 200 includes the lower, first beam member 210,360 and the second, upper beam member 230. The first beam member 210,360 is adapted to separate or split the lower portion 128 of the blower assembly 124 which includes the blower motor. The second beam member 230 is adapted to crush the upper portion 126 of blower assembly 124. According to one exemplary aspect, the first beam member 210 includes a knife edge or projection 300 for engaging the blower assembly. The projection 300 is configured to apply an axial load and a moment on a wall of the blower assembly 124 at the same time making the blower assembly easier to break. Once the blower assembly is cracked, the lower portion 128 contacts the inclined ramp section 340 and is forced downward, thereby separating the blower motor from the rest of the blower assembly 124.

According to another exemplary aspect, the lower portion 128 is separated at the separation guides 430,432 provided on the blower assembly 124. The separation guides 430,432 include respective upper and lower angled surfaces 434,436 on each side of the mating line 350 to help separate the lower portion 128 from the blower assembly 124. The first beam member 360 has a projection 400 which selectively engages the guides 430,432 to separate the lower portion 128 including the blower motor from the upper portion 126 of the blower assembly 124. Therefore, the first beam member 210,360 has specific features and rigidity designed to split the lower portion 128 of the blower assembly 124 including the blower motor.

The present disclosure also provides a method of controlling intrusion of a vehicle part, such as the lower portion 128 of the blower assembly 124, into the passenger cabin 114 during a crash incident. The method comprises positioning the support beam 202 between the vehicle part and the passenger cabin. A first portion 210,360 of the support beam facing the vehicle part has the projection 300,400 and the ramp section 340,410. The method comprises severing the vehicle part with the projection 340,410 of the support beam 202; separating the vehicle part into the lower portion 128 and the upper portion 126; and urging the lower portion 128 of the vehicle part downwardly with the ramp section 340,410 of the support beam 202. The method further comprises deforming the upper portion 126 of the vehicle part with a second portion 230 of the support beam 202.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hanger beam assembly for a vehicle comprising:
a support beam extending in a vehicle widthwise direction, the support beam including a first beam member, the first beam member being positioned between a blower assembly of a vehicle HVAC system and a dashboard on a front passenger side of the vehicle, the first beam member being configured to at least partially sever the blower assembly and direct a lower portion of the blower assembly away from the dashboard during a crash incident to at least partially prevent intrusion of the lower portion of the blower assembly into the dashboard.

2. The hanger beam assembly of claim 1, wherein the first beam member includes a top wall, a side wall, a front wall and a projection extending outwardly toward the blower assembly, the projection configured to at least partially sever the blower assembly.

3. The hanger beam assembly of claim 2, wherein the top wall at least partially includes the projection, the projection defining a generally wedge shaped upper edge of the first beam member.

4. The hanger beam assembly of claim 3, wherein the projection includes an offset region, the offset region including spaced apart angled surfaces which converge toward one another, the offset region adapted to limit an axial load on the first beam member and to create a moment force on a wall of the blower assembly.

5. The hanger beam assembly of claim 2, further including a ramp section which extends at an incline away from the projection, the ramp section configured to urge the lower portion of the blower assembly downwardly which, in turn, separates the lower portion from an upper portion of the blower assembly.

6. The hanger beam assembly of claim 2, wherein the projection is positioned on the front wall and located at least partially below the top wall, the projection being generally triangular shaped.

7. The hanger beam assembly of claim 6, further including a ramp section positioned on the front wall, the ramp section configured to urge the lower portion of the blower assembly downwardly, the ramp section being spaced inwardly from the projection.

8. The hanger beam assembly of claim 6, in combination with the blower assembly, wherein the blower assembly includes the lower portion and a separate upper portion connected to the lower portion, the lower and upper portions of the blower assembly defining a mating line, and further including a lower guide secured to the lower portion adjacent the mating line and an upper guide secured to the upper portion adjacent the mating line, the lower and upper guides being configured to engage the projection during the crash incident and guide the projection along the mating line to facilitate the separation of the lower portion from the upper portion.

9. The combination of claim 8, wherein each of the lower and upper guides includes an outer surface which extends at an incline toward the mating line, the outer surfaces together substantially correspond in shape to the shape of the projection.

10. The hanger beam assembly of claim 1, wherein the first beam member is integrally formed with the support beam.

11. The hanger beam assembly of claim 1, wherein the first beam member is mechanically affixed to the support beam.

12. The hanger beam assembly of claim 1, wherein the support beam includes a second beam member positioned above and extending substantially parallel to the first beam member, the second beam member being configured to engage and deform an upper portion of the blower assembly during the crash incident.

13. A vehicle assembly comprising:
a blower assembly including a lower housing portion and an upper housing portion, the lower housing portion adapted to house a blower motor, the blower assembly being located in front of a front passenger side of the vehicle; and
a hanger beam assembly extending in a widthwise direction of the vehicle, the hanger beam assembly including a first beam member including a projection configured to at least partially separate the lower housing portion from the upper housing portion, the first beam member being configured to direct the separated lower portion of the blower assembly downwardly during a crash incident to at least partially prevent intrusion of the lower portion of the blower assembly into the front passenger side of the vehicle.

14. The vehicle assembly of claim 13, wherein the projection at least partially defines a top wall of the first beam member.

15. The vehicle assembly of claim 13 wherein the projection includes an offset region, the offset region separating the projection into first and second wedge-shaped edges, the offset region including spaced apart angled surfaces which converge from each edge toward one another, the offset region adapted to limit an axial load on the upper beam member and to create a moment force on a wall of one of the upper and lower portion of the blower system.

16. The vehicle assembly of claim 12, wherein the lower and upper housing portions of the blower assembly defining a mating line, and further including a lower guide secured to the lower portion adjacent the mating line and an upper guide secured to the upper portion adjacent the mating line, the lower and upper guides being configured to engage the projection during the crash incident and guide the projection along the mating line to facilitate the separation of the lower portion from the upper portion.

17. The vehicle assembly of claim 13, wherein the first beam member includes a ramp section configured to urge the lower portion of the blower assembly downwardly.

18. The vehicle assembly of claim 13, wherein the hanger beam assembly includes a second beam member positioned above the first beam member, the second beam member being configured to engage and deform the upper housing portion of the blower assembly during the crash incident.

19. A method of controlling intrusion of a vehicle part into a passenger cabin during a crash incident comprises:
positioning a support beam between the vehicle part and the passenger cabin, a first portion of the support beam facing the vehicle part having a projection and a ramp section;
severing the vehicle part with the projection of the support beam;
separating the vehicle part into a lower portion and an upper portion; and
urging the lower portion of the vehicle part downwardly with the ramp section of the support beam.

20. The method of claim 19, further comprising deforming the upper portion of the vehicle part with a second portion of the support beam.

* * * * *